May 1, 1951 J. A. NICHOLSON 2,550,713
DETACHABLE BUCKET DRIP PAN
Filed March 14, 1947
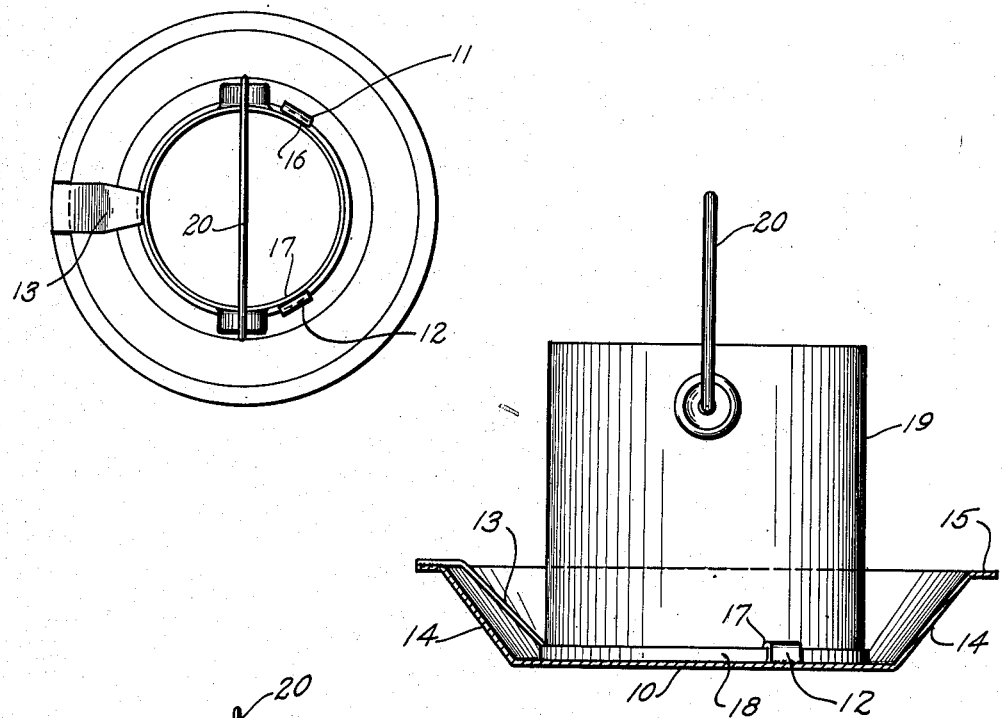
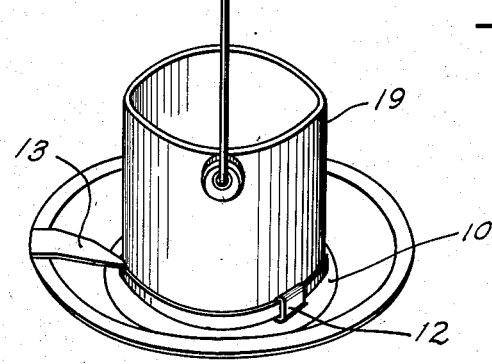
Inventor
John A. Nicholson Patented May 1, 1951

2,550,713

UNITED STATES PATENT OFFICE 2,550,713

DETACHABLE BUCKET DRIP PAN

John A. Nicholson, Wewoka, Okla.

Application March 14, 1947, Serial No. 734,648

1 Claim. (Cl. 220—85)

This invention relates to buckets, pails, cans, and the like, particularly as used for scrubbing and cleaning, and in particular, a pan with an extending edge that may be attached to a bead extending around the lower edge of a bucket or the like, which is carried from place to place with the bucket to prevent fluid from the bucket spilling over the edges so that a bucket with the pan thereon may be placed on a floor, rug, or the like, without danger of leaving a ring or other mark damaging the floor or rug.

The purpose of this invention is to provide a scrub bucket as normally used about the house, which may be carried from place to place and placed upon a floor, table, rug, or the like, without danger of damaging the surface of the object or device upon which it is placed.

In cleaning windows, or in washing or cleaning walls, woodwork, and the like, it is customary to carry a pail containing water with a caustic or other cleaning chemical from place to place, and the cleaning fluid often spills over the side damaging a rug, floor, table, or the like. With this thought in mind, this invention contemplates a comparatively small plate adapted to be attached to the lower end of the pail having an outwardly extending flange positioned to catch drip or the like from the pail, wherein the lower surface thereof remains dry and free of cleaning or other damaging materials.

The object of this invention is, therefore, to provide a protecting tray or pan that may readily be attached to the lower end of a pail or the like that may readily be applied to the pail and used as desired.

Another object of the invention is to provide a drip pan for pails and the like having holding means by which it may readily be attached to a pail without changing the pail.

Another object of the invention is to provide a drip pan for buckets, pails and the like that may readily be attached to and removed from a pail by the average housewife.

A further object of the invention is to provide a drip pan adapted to be attached to pails and the like which is of a simple and economical construction.

With these and other objects in view, the invention embodies a drip pan having a relatively flat lower surface with upwardly extending sides having stationary clips at two spaced points adapted to receive a bead around the lower edge of a pail with the pail positioned on the flat surface, and a spring clip extending from an outer edge of the pan and adapted to snap over the bead of the pail providing holding means of the pan at three substantially equi-distantly spaced points.

Other features and advantages of the invention will appear from the following description taken in connection with the drawings, wherein:

Figure 1 is a view showing a pail with a drip pan attached to the bead at the lower end thereof.

Figure 2 is a cross-section through the drip pan showing a pail, in elevation, positioned thereon.

Figure 3 is a plan view of the pail with the drip pan as shown in Figures 1 and 2.

Referring now to the drawings, wherein like reference characters indicate corresponding parts, the pail drip pan of this invention includes a pan 10 with stationary pail-holding rigid clips 11 and 12 secured to the upper surface thereof, and a spring clip 13.

In the design shown, the drip pan 10 is provided with an upwardly and outwardly sloping flange 14 having a horizontally disposed annular lip 15 around the upper edge and the spring clip 13 is attached to the lip 15 by spot welding, or the like, as illustrated. The clips 11 and 12 are also permanently attached to the flat base 10 of the drip pan and their upper ends are provided with inwardly extending projections 16 and 17 that extend over a circumferential bead 18 extending around the lower end of a pail 19. The pail may be provided with a handle or bail 20, and although the pail is illustrated as having straight upwardly extending sides, it will be understood that the sides may slope outward, such as the side surfaces or walls of a bucket.

It will also be understood that the drip pan may be comparatively shallow and the outwardly extending edges thereof may extend outward a comparatively short distance in relation to the pail. It will be understood that other modifications may be made in the design or arrangement of the parts without departing from the spirit of the invention.

What is claimed is:

The combination with a cylindrical pail having an annular bead adjacent the lower edge thereof, of a drip pan arranged in surrounding relation with respect to the bottom of said pail and supporting the latter, said drip pan comprising a plate positioned in abutting relation with respect to the bottom of said pail, an upwardly and outwardly disposed circumferential flange having its lower end fixedly secured to said plate and having its upper edge turned over to form an annular lip, a pair of clips arranged in spaced relation with respect to each other adjacent the peripheral wall of said pail, each of said clips having one end fixedly secured to said plate and having the other end bent inwardly to overlie and engage the annular bead on said pail, and a resilient spring-clip positioned adjacent the peripheral wall of the pail on a side thereof opposite to that engaged by said pair of clips, said resilient spring-clip having one end fixedly secured to said lip and having the other end extending inwardly for resiliently gripping the portion of the annular bead on said pail adjacent thereto.

JOHN A. NICHOLSON.

REFERENCES CITED

The following references are of record in the file of this patent:

UNITED STATES PATENTS

| Number | Name | Date |
|---|---|---|
| 862,953 | Westlake | Aug. 13, 1907 |
| 864,556 | Reiter | Aug. 27, 1907 |
| 2,065,591 | Kasik | Dec. 29, 1936 |
| 2,394,319 | McDonald | Feb. 5, 1946 |